May 28, 1957   C. J. WHEELER   2,793,433
APPARATUS FOR SEVERING CAST IRON PIPE AND THE LIKE
Filed Nov. 9, 1956

INVENTOR
CHARLES J. WHEELER
BY C.T. Cross
ATTORNEY

United States Patent Office 2,793,433
Patented May 28, 1957

2,793,433

APPARATUS FOR SEVERING CAST IRON PIPE AND THE LIKE

Charles J. Wheeler, Ashtabula, Ohio

Application November 9, 1956, Serial No. 621,410

6 Claims. (Cl. 30—92)

This invention relates to the cutting of hollow articles, and more particularly relates to new and improved readily adjustable apparatus for cutting cylindrical or tubular articles.

This is a continuation-in-part of my application Ser. No. 578,208, filed April 16, 1956.

Up to the present time, the cutting of hollow articles, especially cylindrical or tubular articles such as various types of conduits or pipes, notably cast iron pipe, frequently has been a difficult and time-consuming operation. Cast iron pipe of varying sizes and wall thicknesses is typical of a hollow article which has heretofore been especially difficult to cut quickly and accurately. For that reason, cast iron pipe is particularly referred to throughout the specification and claims although it is to be understood that the practice of this invention, while especially advantageous in the cutting of cast iron pipe is not limited thereto.

Cutting of cast iron pipe heretofore has generally involved the use of hack saws, cold chisels and/or cutting apparatus rotatable or oscillatable about the pipe to effect cutting thereof. While, in some instances, these prior techniques may be satisfactory, certain difficulties generally characterize each of these procedures which render their use disadvantageous in many applications. The use of metal cutting torches also has been employed but there are limitations, too, in the use of such a technique.

The use of both manually operated and power hack saws, while affording means of cutting pipe accurately, generally is slow and relatively costly since the saw blade life often is relatively short. Moreover, it will be appreciated that, at times, the use of a power hack saw is either impracticable or impossible. Moreover, where pipe installation is being carried out in construction work, serious space limitations occasionally are encountered which render the use of any type saw difficult. The use of chisels in the cutting of pipe frequently leads to relatively inaccurate and slow cutting. In addition, as with the use of saws, space limitations at times also impose restrictions on the use of chisels or other similar cutting devices.

Perhaps one of the most common types of pipe cutter employed up to this time has been one embodying a device adapted to be rotated or oscillated about the pipe during the cutting operation. While such devices offer certain advantages over other prior means of cutting pipe, these rotatable or oscillatable cutters have not provided a completely satisfactory solution to the problem of accurately and quickly cutting pipe, especially under conditions where cutting cost and space limitations are additional factors to be considered.

While the invention described and claimed in my above-mentioned application comprises a highly advantageous apparatus and method, and represents a singular advance over the prior art, the present invention represents an improvement thereover which provides a more rapid and simple control and ready adjustment of the compound leverage pressure clamp to facilitate cutting articles of varying sizes.

Accordingly, the principal object of this invention is to avoid the difficulties heretofore encountered and to provide a new and improved method and readily adjustable apparatus for cutting pipe or other hollow articles of varying sizes.

A further object of the invention is the provision of new and improved adjustable apparatus for cutting hollow articles, notably cast iron pipe.

A still further object of the invention is to provide new and hand operable, adjustable apparatus for quickly and accurately cutting pipe.

These and other objects and advantages of the invention will more fully appear from the following description thereof.

Apparatus of this invention adapted to cut a hollow article generally includes at least one cutter having a cutting edge adapted, while substantially stationary with respect to the article, to exert radially-directed, article-cutting pressure and readily adjustable means to apply pressure to said cutting edge. A preferred embodiment contemplates adjustable apparatus which is adapted to provide circumferentially uniform radial article-cutting pressure at a plurality of uniformly spaced points on said article, i. e., around the circumference of the article where cutting is desired.

A more specifically preferred embodiment of apparatus of this invention utilizes a plurality of cutters connected into a non-extensible linkage adapted to surround the article to be cut and while stationary with respect thereto to apply, via a readily adjstable compound leverage pressure clamp more fully described hereinafter, uniformly circumferentially distributed, radially-directed pressure sufficient to cut the article, e. g., four inch diameter cast iron pipe, without rotation or oscillation of the apparatus about the article.

Briefly, the present invention specifically contemplates cutter apparatus comprising a non-extensible linkage including a plurality of spaced cutters and a readily-adjustable compound leverage pressure clamp having a first jaw secured to one end of the linkage and a second jaw adapted to engage the linkage at a point dictated by the size of the article to be cut, the second jaw being rigidly, yet readily adjustably, spaced from and secured to, the first jaw intermediate their ends via an upstanding stud on the first clamp jaw whereby rapid and simple adjustment of the jaw spacing can be effected to facilitate cutting of articles of varying sizes.

Referring to the accompanying drawing.

Figure 1:
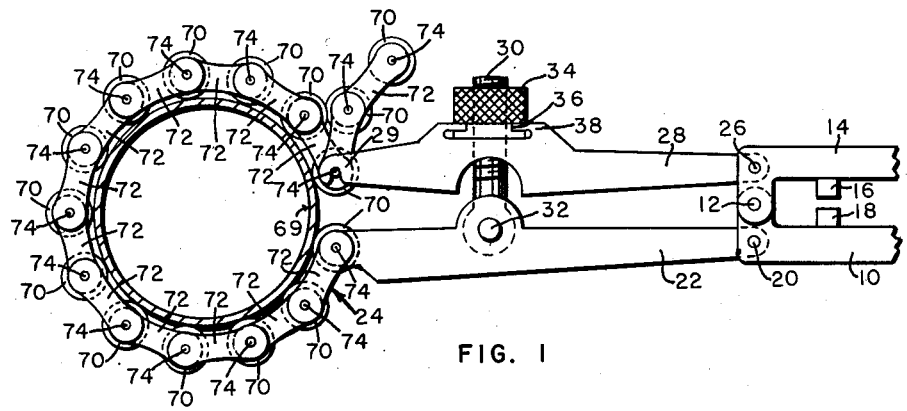
Fig. 1 is a fragmentary view of apparatus of this invention.
Figure 2:
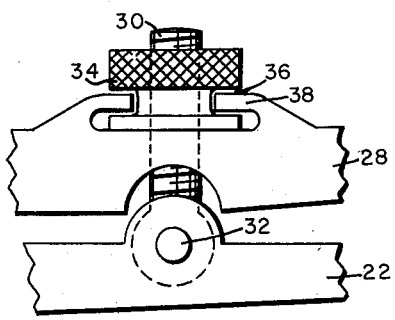
Fig. 2 is an enlarged fragmentary view of a portion of the apparatus of Fig. 1.
Figure 3:
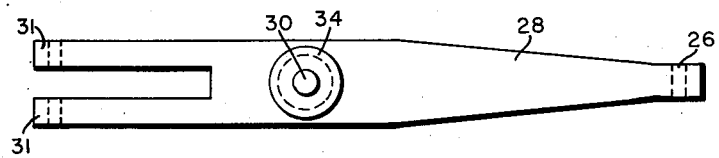
Fig. 3 is a plan view of a portion of the apparatus shown in Fig. 1, with parts broken away for clarity.

Referring more specifically to the drawing, the apparatus illustrated in Figs. 1, 2 and 3 comprises a first power lever 10 pivotally secured at one end at a first common pivot 12 to a similar second power lever 14. Provided between the power levers 12 and 14 are motion stops 16 and 18. Pivotally secured at one end to power arm 10, via a pivotal connection 20 adjacent the first common pivot 12, is a first clamp jaw 22 which at its opposite end is secured to a cutter linkage indicated generally at 24 and shown disposed about a pipe 69 to be cut. Pivotally secured at one end to power arm 14 via pivotal connection 26 adjacent the first common pivot 12 is a second clamp jaw 28 which at its opposite end is provided with a clamp 29 engaging the cutter linkage 24. Intermediate its ends, clamp jaw 22 is provided with an upstanding stud 30 pivotally secured thereto via a pivotal connection 32, the stud 30 being threaded for a portion of its length. The stud 30 extends through clamp jaw 28 and is threadedly engaged by a knurled lock nut 34 provided with a circumferential groove 36 thereabout in which a circular gripping edge 38 of the clamp jaw 28 is disposed to permit rotation of nut 34 about stud 30 in threaded engagement therewith, thereby moving clamp jaw 28 up and down the stud 30 and thus adjusting the effective spacing of the clamp jaws, yet precluding disengagement and separation of nut 34 and clamp jaw 28.

Figure 4:
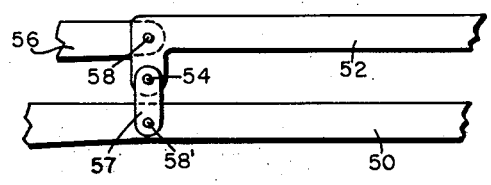
Fig. 4 is a fragmentary view of another embodiment of apparatus embodying the invention.

Fig. 4 illustrates another embodiment of the invention wherein a rigid, non-pivoted first power arm-clamp jaw 50 is connected to a second power arm 52 via a pivotal connection 54, link 57 and pivotal connection 58' on power arm-clamp jaw 50. Pivotally secured to the second power arm 52 via pivot 58 is second clamp jaw 56. Clamp jaws 50 and 56 are actuated by application of pressure to power arms 50 and 52 as in the operation of the apparatus shown in Fig. 1.

Pressure is applied by pressing the power levers 10 and 14 together, thus forcing apart the pivots 20 and 26 and thereby pivoting, with greatly increased force, clamp jaws 22 and 28 about a pivot 32 with the result that a high degree of tension is applied to the cutter assembly 24 disposed about the pipe 69 to be cut. This tension transmits a circumferentially-uniform, radially-directed pressure which effects a clean, sharp cutting of the pipe.

To adjust the apparatus, nut 34, preferably knurled as shown, is turned to adjust the spacing of clamp jaws 22 and 28 thereby adjusting the spacing of clamp jaws 22 and 28 to facilitate cutting articles of varying sizes. It will be appreciated, thus, that this invention permits rapid and easy hand adjustment of the cutter in use to cut articles of widely varying sizes.

The cutter assembly referred to generally at 24 comprises a plurality of links 72 supporting uniformly-spaced cutters 70 assembled into a non-extensible chain or linkage by pins 74 extending through said cutters and links to permit engagement thereof by the hook 29 of jaw 28, said assembly adapted when disposed about an article 69 to be cut, e. g., pipe 69, to effect cutting thereof while stationary with respect thereto when tension is applied to said cutter assembly by the clamp jaws 22 and 28.

The various cutters, clamp jaws and other elements described herein may be formed of suitable metal, alloy, or other high strength material capable of transmitting pressure to the pipe or other article to be cut without cracking, shattering or too rapid dulling. Illustrative of suitable materials are various high strength steels including high carbon steels and low or medium carbon steels. It will be understood, of course, that as a practical matter the particular steel employed in forming the cutters and cutting edges is dictated by a consideration of the hardness, brittleness, availability, etc. The angle included between the surfaces defining a cutting edge generally may be varied also, a typically preferred angle being about 45°.

It is to be understood that although the invention has been described with specific reference to particular embodiments thereof, it is not to be so limited, since changes and alterations therein may be made which are within the full intended scope of this invention as defined by the appended claims.

What is claimed is:

1. Apparatus for cutting a hollow article, said apparatus including at least one cutter having a cutting edge adapted, while stationary with respect to said article, to effect cutting thereof when disposed thereabout via application of radially-directed pressure, there being connected to said cutter a compound leverage pressure clamp comprising, in combination, a pair of power levers pivotally joined at a first common pivot, a first clamp jaw secured at one end to said cutter and at its opposite end to one of said power levers adjacent said first common pivot, a second clamp jaw pivotally secured to the other power lever at one end and having means to engage said cutter, said first clamp jaw having thereon intermediate its ends an upstanding pivotally mounted stud extending through said second clamp jaw and adjusting means on said stud to alter the spacing of said clamp jaws.

2. Apparatus as in claim 1 wherein said adjusting means comprise a nut threadedly engaged on said stud and rotatably secured to said second clamp jaw.

3. Apparatus as in claim 1 wherein said adjusting means comprise a nut threadedly secured to said stud and rotatably yet fixedly mounted on said second clamp jaw.

4. Apparatus according to claim 1 wherein said cutter comprises a non-extensible linkage including a plurality of cutting edges.

5. Apparatus according to claim 1 wherein said cutter comprises a non-extensible linkage provided with a plurality of circular cutting edges.

6. Apparatus as in claim 1 wherein the said adjusting means comprise a nut threadedly engaging said stud and having a cylindrical groove thereabout, said second clamp jaw having a means thereon rotatably engaging said nut in said groove.

No references cited.